United States Patent
Woszidlo et al.

(10) Patent No.: US 11,192,626 B2
(45) Date of Patent: Dec. 7, 2021

(54) LEADING EDGE COOLING SYSTEMS AND METHODS

(71) Applicant: The Boeing Company, Chicago, IL (US)

(72) Inventors: Rene Woszidlo, St. Charles, MO (US); James Henry Mabe, College Station, TX (US); Virginia Louise Wilson, Manchester, MO (US)

(73) Assignee: The Boeing Company, Chicago, IL (US)

( * ) Notice: Subject to any disclaimer, the term of this patent is extended or adjusted under 35 U.S.C. 154(b) by 133 days.

(21) Appl. No.: 16/666,227

(22) Filed: Oct. 28, 2019

(65) Prior Publication Data

US 2021/0122475 A1    Apr. 29, 2021

(51) Int. Cl.
*B64C 3/36* (2006.01)
*B64C 30/00* (2006.01)
*B64C 3/14* (2006.01)

(52) U.S. Cl.
CPC ............... *B64C 3/36* (2013.01); *B64C 30/00* (2013.01); *B64C 2003/146* (2013.01)

(58) Field of Classification Search
CPC ......... B64D 13/006; B64C 3/36; B64C 30/00; F42B 15/34; F28D 2021/0021
See application file for complete search history.

(56) References Cited

U.S. PATENT DOCUMENTS

| | | | | |
|---|---|---|---|---|
| 2,979,293 A | * | 4/1961 | Mount | F02C 7/224 244/117 A |
| 3,005,607 A | * | 10/1961 | Ferri | B64D 13/006 244/117 A |
| 3,043,118 A | * | 7/1962 | McLafferty | B64D 13/006 62/402 |
| 3,080,816 A | * | 3/1963 | Levine | B64D 13/006 250/238 |
| 3,093,348 A | * | 6/1963 | Schelp | B64D 13/006 244/15 |
| 3,116,613 A | * | 1/1964 | Evelyn | B64D 13/006 62/239 |
| 3,369,782 A | * | 2/1968 | Billig | B64D 13/006 244/117 A |
| 3,410,502 A | * | 11/1968 | Leadon | B64G 1/50 244/164 |
| 3,438,602 A | * | 4/1969 | Kelly | B64C 1/38 244/135 R |

(Continued)

FOREIGN PATENT DOCUMENTS

CN    109334974 A  *  2/2019  ............. B64C 30/00

OTHER PUBLICATIONS

Hossain, Mohammad A., et al., "Sweeping jet impingement heat transfer on a simulated turbine vane leading edge" Journal of the Global Power and Propulsion Society, 2018, 2: 402-414.

*Primary Examiner* — Joseph W Sanderson
(74) *Attorney, Agent, or Firm* — Kolisch Hartwell, P.C.

(57) ABSTRACT

An impingement cooling system is disclosed, including an airfoil having an aerodynamically sharp leading edge, a fluid source, and a fluid dispersal device connected to the fluid source. The leading edge has a concave internal surface and the fluid dispersal device is configured to project a fluctuating stream of fluid toward the internal surface.

20 Claims, 6 Drawing Sheets

(56) References Cited

U.S. PATENT DOCUMENTS

| | | | | | |
|---|---|---|---|---|---|
| 3,470,703 | A | * | 10/1969 | Wen | B64D 13/006 |
| | | | | | 62/86 |
| 4,671,348 | A | * | 6/1987 | Bauer | B64C 3/36 |
| | | | | | 165/104.26 |
| 5,107,920 | A | * | 4/1992 | Scotti | F28F 13/10 |
| | | | | | 165/109.1 |
| 5,291,830 | A | * | 3/1994 | Zwan | B64C 1/38 |
| | | | | | 102/293 |
| 5,348,256 | A | * | 9/1994 | Parikh | B64D 15/04 |
| | | | | | 244/208 |
| 7,033,136 | B2 | * | 4/2006 | Botrel | F01D 5/187 |
| | | | | | 415/115 |
| 8,251,312 | B1 | * | 8/2012 | Daso | B64C 30/00 |
| | | | | | 244/130 |
| 9,016,632 | B1 | * | 4/2015 | Daso | B64C 30/00 |
| | | | | | 244/130 |
| 10,450,873 | B2 | * | 10/2019 | Barker | F01D 9/042 |
| 2015/0191238 | A1 | * | 7/2015 | Hucker | B29C 70/06 |
| | | | | | 244/117 R |
| 2018/0051943 | A1 | | 2/2018 | Gissen et al. | |
| 2018/0057191 | A1 | * | 3/2018 | Zhang | F42B 10/46 |
| 2019/0145441 | A1 | * | 5/2019 | Tomac | B05B 1/08 |
| | | | | | 137/826 |

* cited by examiner

LEADING EDGE COOLING SYSTEMS AND METHODS

BACKGROUND

The leading edge of a wing on high performance aircraft such as hypersonic aircraft experiences extreme thermal conditions during flight. Along with other aerodynamically sharp airfoils and airfoils under comparable thermal conditions on equipment such as turbines, such leading edge structures require highly efficient thermal management. However, the tight wedge-shaped space inside the structures renders typical active cooling systems inefficient and prone to stagnation. Instead, current solutions include methods such as ablative cooling, use of expensive heat-tolerant materials, or slow capillary action systems. Design of aerodynamically sharp airfoils for hypersonic flight, including leading edge radius and material selection, is constrained by the available thermal management systems.

SUMMARY

The present disclosure provides systems, apparatuses, and methods relating to impingement cooling of airfoil leading edges. In some examples, an impingement cooling system may include an airfoil having an aerodynamically sharp leading edge, a fluid source, and a fluid dispersal device connected to the fluid source. The leading edge may have a concave internal surface and the fluid dispersal device may be configured to project a fluctuating stream of fluid toward the internal surface.

In some examples, a method of cooling a leading edge of a wing of a hypersonic aircraft may include channeling fluid from a fluid source to a fluid dispersal device inside the wing. The method may further include projecting a fluctuating stream of fluid from the fluid dispersal device toward an internal surface of the leading edge of the wing.

In some examples, a cooling system for a leading edge of an airfoil may include a coolant source and a fluid dispersal device. The fluid dispersal device may include an array of delivery channels, each channel configured to project a fluctuating stream of coolant from the coolant source onto an internal surface of the leading edge of the airfoil. The fluid dispersal device may further include a first return channel, configured to return coolant from the leading edge to the coolant source.

Features, functions, and advantages may be achieved independently in various examples of the present disclosure, or may be combined in yet other examples, further details of which can be seen with reference to the following description and drawings.

DETAILED DESCRIPTION

Figure 1:
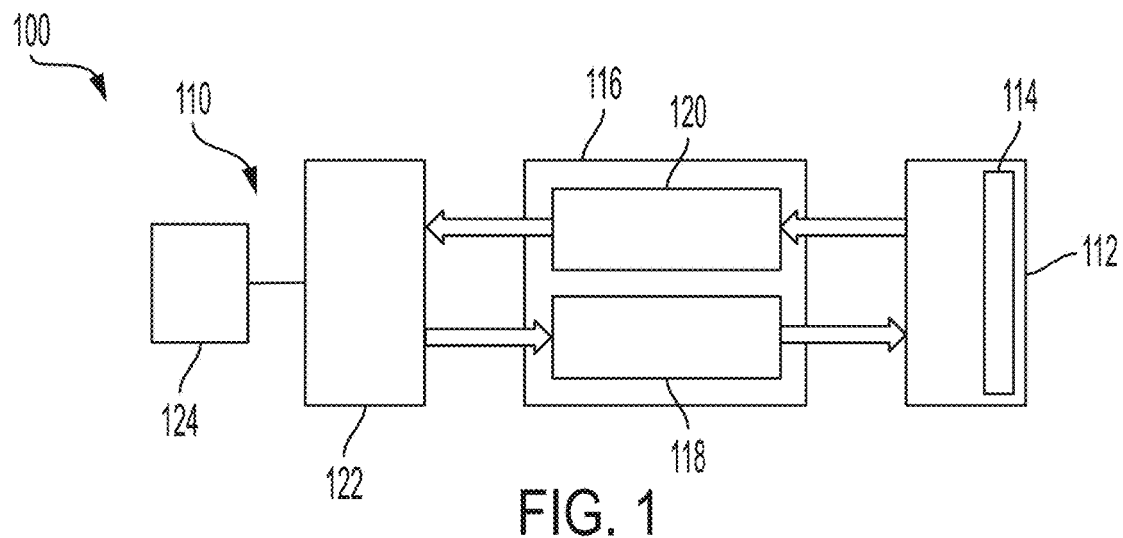
FIG. 1 is schematic diagram of an illustrative leading edge cooling system in accordance with aspects of the present disclosure.

Various aspects and examples of a leading edge cooling system including fluctuating coolant jets, as well as related methods, are described below and illustrated in the associated drawings. Unless otherwise specified, a cooling system in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through D, each of which is labeled accordingly.

Overview

In general, a leading edge cooling system in accordance with the present teachings may include an airfoil, such as a wing or a turbine blade. The cooling system may also be described as housed in the airfoil, and/or configured to cool the airfoil. A cooling system such as is described herein may be particularly appropriate to airfoils having a sharp leading edge, and/or a small leading edge radius. An aerodynamically sharp leading edge may be understood to include any leading edge shape exhibiting behavior typical of a sharp-edged wing, such as a power law shaped leading edge with an exponent value of one half or less.

The cooling system may include a fluid dispersal device and/or structure, which may supply and exhaust coolant for impingement cooling of an internal surface of the leading edge of the airfoil. The fluid dispersal device may project a plurality of fluctuating streams of coolant fluid toward the internal surface. The fluid dispersal device may further return heated coolant from the internal surface to a coolant supply and/or recycling system.

The fluid dispersal device may be configured to supply and exhaust coolant such that no regions of stagnant coolant are created along the leading edge. For example, the plurality of fluctuating streams of coolant may produce sufficient turbulence to force heated liquid coolant into return channels of the fluid dispersal device and/or to carry bubbles of vaporized coolant away from the internal surface. Such configuration may render impingement cooling feasible in the tight space of a sharp airfoil with a small leading edge radius. Otherwise, stagnant coolant may continue to take on additional heat, leading to hot spots, or bubbles of vaporized coolant may become vapor locked once the Critical Heat Flux is exceeded, leading to destructive conditions such as film boiling (transition or stable film).

FIG. 1 is a schematic diagram of an illustrative cooling system 100. The cooling system includes an airfoil 110, having a wedge-shaped internal cavity 112 defined in part by a concave internal surface 114. A fluid dispersal device 116 is mounted in airfoil 110, in fluid communication with cavity 112. The fluid dispersal device includes at least one delivery channel 118 and at least one return channel 120, each in fluid communication with cavity 112 and a coolant source 122.

Delivery channel 118 may include active and/or passive mechanisms to generate at least one fluctuating jet of coolant, such that the jet impinges on internal surface 114. For example, delivery channel 118 may include a fluidic oscillator, a restricted aperture, or may divide into two or more channels. The fluctuating jet may also be described as sweep or sweeping, pulsing, meandering, unstable, and/or turbulent. Coolant passing through delivery channel 118 may be under pressure, and may be in liquid form.

Coolant projected from delivery channel 118 onto internal surface 114 may absorb heat from the surface. In some examples, the coolant may vaporize or undergo a phase change from liquid to gas. The coolant may then be urged away from internal surface 114 by the fluctuating jet of incoming coolant, and into return channel 120. In examples where the coolant has vaporized, bubbles of vaporized coolant may also be urged clear of the internal surface and into return channel 120.

Return channel 120 may be configured to remove heat from the coolant. For example, the return channel may direct the coolant along an outer skin of the airfoil. For aerodynamically sharp airfoils such as airfoil 110, heat flux may drop off quickly from the leading edge. Accordingly, heat from the coolant may be transferred through the outer skin of the airfoil to the external environment. In examples where the coolant has vaporized, the coolant may be sufficiently cooled to re-condense.

Cooling system 100 is preferably a closed fluid system. That is, cooling system 100 retains and recirculates the coolant fluid, and no fluid is lost or added. Instead, a finite volume of coolant is continuously recirculated through the system. A pressure management apparatus 124, such as a compressor or pump, is operatively connected to coolant source 122, and configured to maintain a constant coolant pressure in cooling system 100. The apparatus may be configured to compensate for a pressure drop through the dispersal structure. In some examples, cooling system 100 may further include additional management apparatus such as a temperature sensor, pressure sensor, refrigeration device, condensation mechanism, filter, and/or control circuit.

Cooling system 100 may operate independently or may be operatively integrated with a vehicle or equipment including airfoil 110. For example, airfoil 110 may be the wing of an aircraft and cooling system 100 may be connected to a power system and/or a control system of the aircraft.

Examples, Components, and Alternatives

The following sections describe selected aspects of exemplary cooling systems as well as related systems and/or methods. The examples in these sections are intended for illustration and should not be interpreted as limiting the entire scope of the present disclosure. Each section may include one or more distinct examples, and/or contextual or related information, function, and/or structure.

A. Illustrative Leading Edge Cooling System

As shown in FIGS. 2-7, this section describes an illustrative cooling system 200. Cooling system 200 is an example of a leading edge cooling system, as described above. The cooling system is configured to cool a leading edge 208 of a wing 210.

Figure 2:
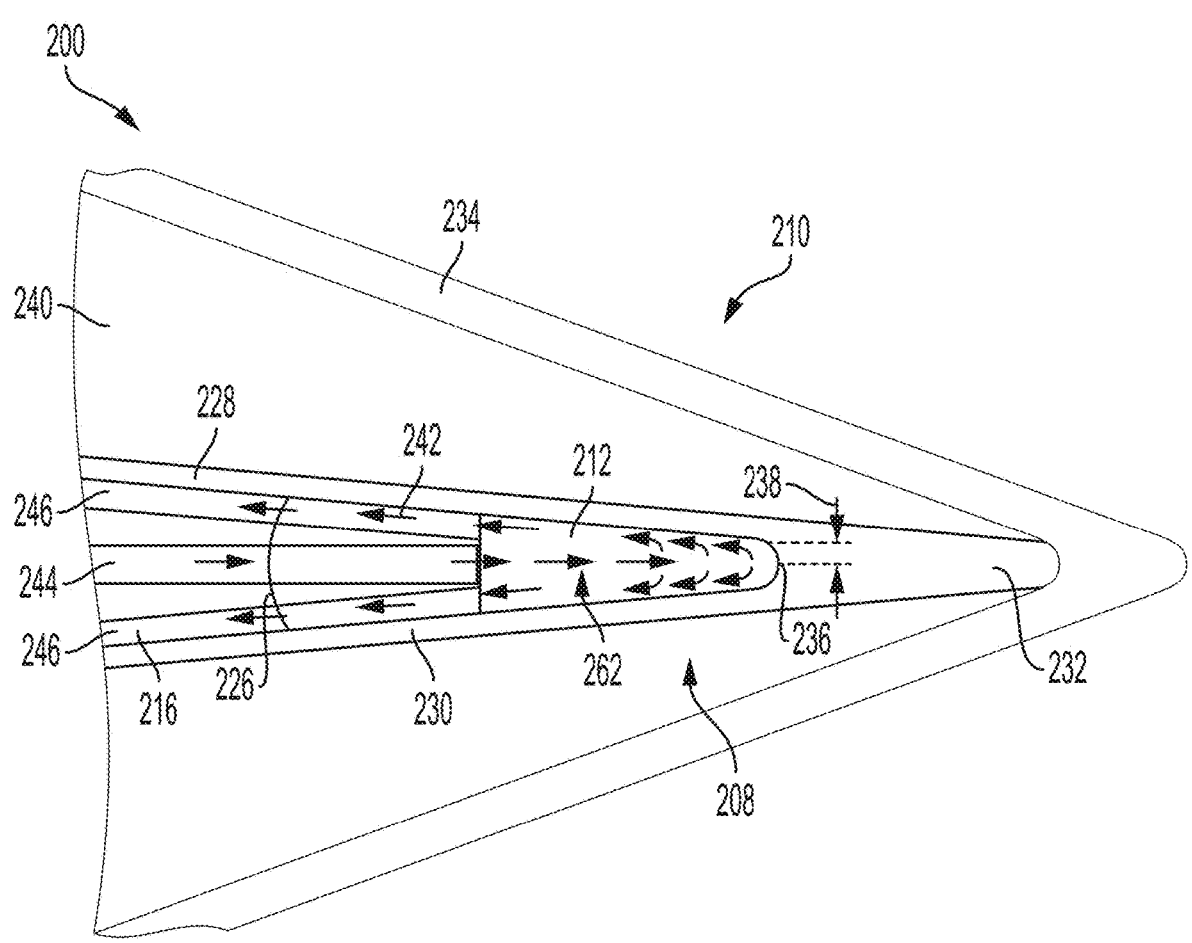
FIG. 2 is a cross-sectional view of a leading edge of a hypersonic aircraft wing, including another illustrative leading edge cooling system.

As shown in FIG. 2, cooling system 200 includes a fluid dispersal device, or dispersal structure 216. The cooling system may further include a coolant reservoir and a compressor, which are not depicted. Dispersal structure 216 is shaped to conform to an internal cavity 212 of leading edge 208. The cavity and dispersal structure are wedge-shaped, each having a wedge angle 226. The wedge angle may depend on the aerodynamic design of wing 210, but for high performance aircraft may generally be less than 20 degrees. In the present example, wedge angle 226 is approximately 10 degrees.

Leading edge 208 includes an upper skin 228 and a lower skin 230, which converge to a wingtip 232. As wing 210 reaches hypersonic speeds, a shockwave 234 forms at wingtip 232, intensely heating the material of the wingtip. In the present example, heat flux at the wingtip may reach as much as 1,500 watts per square centimeter or more. Subsonic aircraft or other vehicles and/or equipment with sharp airfoils may experience similarly localized heating, to a lesser degree.

Cavity 212, inside leading edge 208, is defined between a concave internal surface 236, an internal surface of upper skin 228 and an internal surface of lower skin 230. Cooling system 200 is configured to channel a flow of coolant to impinge on concave internal surface 236, to carry away heat from wingtip 232.

Internal surface 236 may also be described as circular or arcuate, and has a radius 238. Similarly to wedge angle 226, radius 238 of internal surface 236 may depend on the aerodynamic design of wing 210, but for high performance aircraft may generally be less than five millimeters. In the present example, radius 238 is approximately one millimeter. The confined, angular space of cavity 212 and small radius of internal surface 236 may render coolant in the cavity prone to stagnation. Cooling system 200 allows cooling of this constricted geometry by preventing stagnation with fluctuating coolant flows, as described further with reference to FIGS. 5-7 below.

As shown in FIG. 2, shockwave 234 diverges quickly from leading edge 208, causing heating of the leading edge to be strongly localized to wingtip 232. Heat flux falls off quickly chordwise along wing 210. This localization of heating allows effective transfer of heat carried by the coolant from internal surface 236, through the upper and lower skins 228, 230 to an exterior environment 240. This transfer is described further with reference to FIG. 3, below.

Cooling system 200 may include any appropriate fluid coolant, including liquid, gas, and/or a combination thereof.

For example, a coolant may be selected which has a boiling point such that the coolant may be stored as a liquid and at least a portion of the coolant may vaporize when impinging onto internal surface 236. For another example, a coolant may be selected which has a boiling point and/or heat capacity sufficient to avoid vaporization. The coolant may be selected according to properties of wing 210, such as expected heat flux at wingtip 232, material of wingtip 232 and/or internal surface 236, and/or a typical temperature range of exterior environment 240. The coolant may be additionally or alternatively selected according to desired properties of cooling system 200, such as overall weight and/or operational pressure.

Coolant may flow through cooling system 200 and dispersal structure 216 generally as indicated by arrows 242. The coolant is supplied from a coolant source, not shown, through a delivery channel 244. The delivery channel generates a fluctuating jet of coolant, impinging on internal surface 236 to absorb heat. The heated coolant is then urged over and under the jet of coolant, along the internal surfaces of upper skin 228 and lower skin 230 into return channels 246. The return channels may return the coolant to the coolant source for subsequent reuse.

Figure 3:
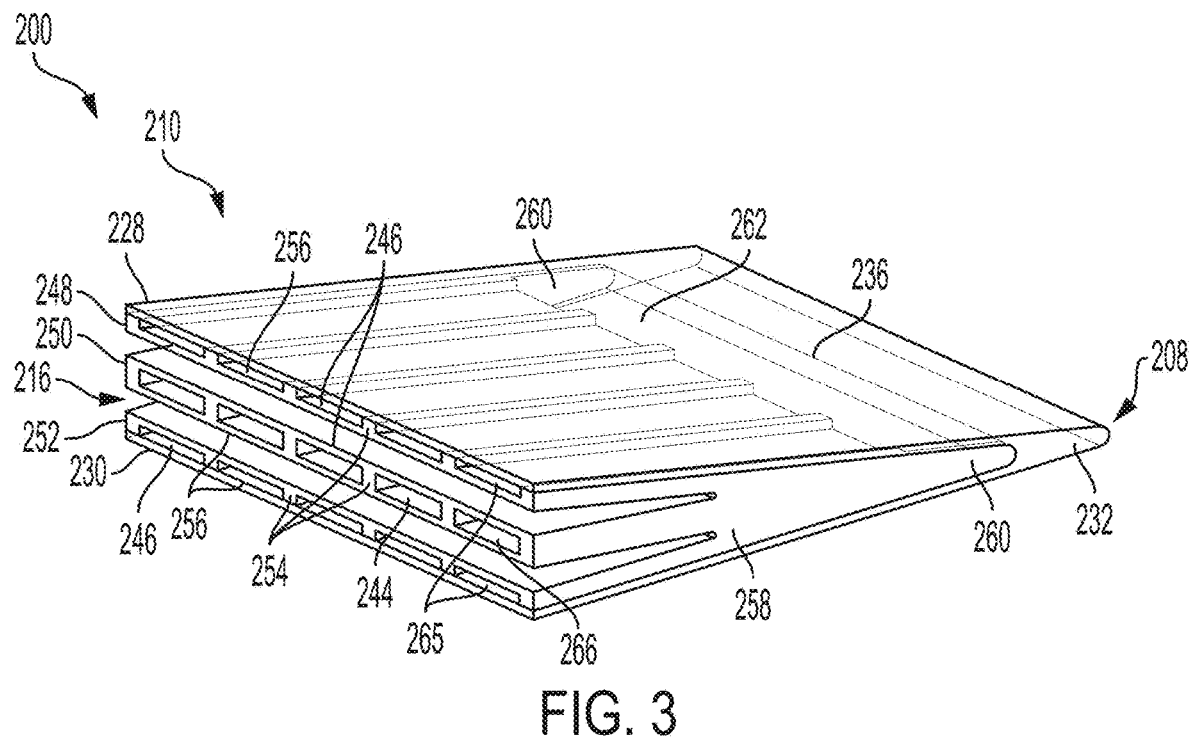
FIG. 3 is an isometric rear view of a portion of the leading edge of FIG. 2.
Figure 4:
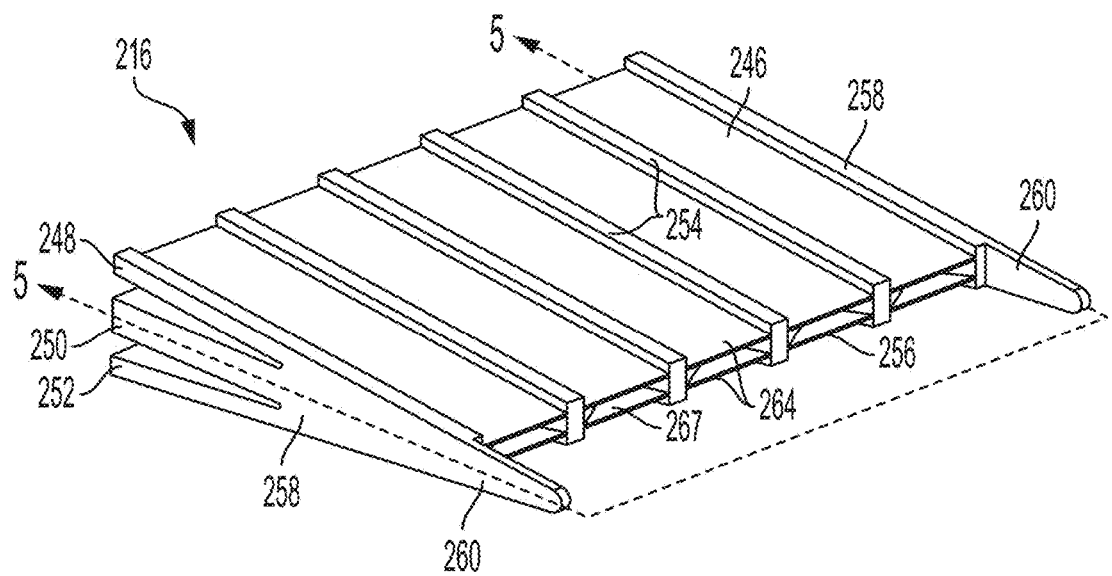
FIG. 4 is an isometric front view of the internal dispersal structure of the cooling system of FIG. 2.

FIG. 3 is an isometric view of dispersal structure 216, with a cut-away portion of wing 210 depicted as transparent. Dispersal structure 216 may also be described as a dispersal module. A plurality of dispersal modules may be positioned along the span of wing 210. In some examples, adjacent dispersal modules may be fastened or otherwise joined together. In some examples, a single dispersal structure may span a full length of the wing.

Dispersal structure 216 includes a first layer 248, a second layer 250, and a third layer 252, which converge toward internal surface 236 to form the wedge-shape of the dispersal structure. First layer 248 is disposed adjacent, substantially parallel to, and in contact with the internal surface of upper skin 228, and third layer 252 is disposed adjacent, substantially parallel to, and in contact with the internal surface of lower skin 230. Second layer 250 is sandwiched between the first and third layers. In some examples, dispersal structure 216 may include only two layers, or may include additional layers.

Second layer 250 defines a plurality of delivery channels 244, while first and third layers 248, 252 each define a plurality of return channels 246. Each layer includes a plurality of vertical walls 254, which separate adjacent channels. In first layer 248, vertical walls 254 extend up from a spanning wall 256 to contact upper skin 228. In third layer 252, vertical walls 254 extend down from a spanning wall 256 to contact lower skin 230. In second layer 250, vertical walls 254 extend between two spanning walls 256. As shown in FIG. 2, spanning wall 256 of first layer 248 and an upper one of the two spanning walls of second layer 250 merge into a single spanning wall as the two layers converge. Similarly, spanning wall 256 of third layer 252 and a lower one of the two spanning walls of second layer 250 merge into a single spanning wall as the two layers converge.

As can be seen in FIG. 3, each return channel 246 is defined between the first layer 248 or the third layer 252 and the internal surface of upper skin 228 or lower skin 230. That is, as coolant travels along the return channel, the coolant is in contact with either the upper or lower skin. As noted above, the upper and lower skins may be largely unheated and therefore conduct heat from the coolant through to the external environment. Return channels 246 may be described as each substantially parallel to an outer mold line of either the upper or lower skin of the airfoil.

A chordwise extent of dispersal structure 216 may be selected to allow the coolant to cool completely before being returned to the coolant source. The quick drop-off in heat flux away from the wingtip may allow a small chordwise extent. In the present example, the chordwise extent of the dispersal structure is approximately five centimeters. In examples where coolant is expected to vaporize after contact with internal surface 236, return channels 246 may be configured to allow condensation of the coolant before being returned to the coolant source.

First layer 248, second layer 250, and third layer 252 of dispersal structure 216 are spaced from internal surface 236 to leave an open region 262 of cavity 212. The open region may allow mixing of the coolant, which in turn may improve heat transfer rates. A chordwise extent of the open portion may be selected according to desired dynamic coolant behavior such as turbulence and mixing.

At each of first and second spanwise ends of dispersal structure 216, vertical walls 254 of layers 248, 250, 252 may be described as collectively forming an outer wall 258. Each outer wall 258 further includes a divisional extension 260, which extends from the three layers to contact internal surface 236. Divisional extensions 260 may divide open region 262 into discrete sub-sections and preclude coolant interaction between the sub-sections. Divisional extensions 260 and outer walls 258 may seal with the internal surfaces of upper skin 228 and lower skin 230, and internal surface 236 to effect the division. Such division may prevent undesirable flow patterns such as continuous spanwise currents, which maintain coolant in extended contact with internal surface 236.

In addition to dispersal of coolant, dispersal structure 216 may perform a structural function in wing 210. That is, the structure may be configured to support the wing skin and handle structural loads. For example, dispersal structure 216 may comprise a structurally appropriate material such as an aircraft-grade aluminum alloy, or other metal. For another example, outer walls 258 and divisional extensions 260 may be of sufficient thickness to allow effective load transfer.

Each return channel 246 includes an inlet 264, shown in FIG. 4, and an outlet 265, shown in FIG. 3. In the present example, both the inlets and outlets have a rectangular shape, and may be described as slots. In some examples, outlets 265 may be configured for fluid communication and/or or interface with the coolant source. For example, the outlets may include gaskets, threading, or fastener features appropriate to connection of tubing. In some examples, inlets 264 may be configured according to desired fluid flow in open region 262 and/or desired intake of coolant. For example, the inlets may be chamfered to avoid restriction or choking of intake.

Each delivery channel 244 includes an inlet 266, shown in FIG. 3, and an outlet 267, shown in FIG. 4. In the present example, both the inlets and outlets have a rectangular shape, and may be described as slots. In some examples, similarly to outlets 265 of the return channels, inlets 266 may be configured for fluid communication and/or or interface with the coolant source. In some examples, outlets 265 may be configured to according to desired fluid flow in open region 262 and/or to facilitate generation of a fluctuating jet of coolant as described further below.

FIG. 5 shows the internal structure of second layer 250 of dispersal structure 216, with first layer 248 and the upper one of the two spanning walls 256 of the second layer cut away. As indicated in FIG. 4, dispersal structure 216 is cut along plane 5-5, which extends through second layer 250 parallel to the spanning walls of the layer. Second layer 250 may be described as including an array of fluidic oscillators 270. An array of fluidic oscillators may be defined as a plurality of fluidic oscillators arranged in a regular order, repeating pattern, and/or series. In the present example, fluidic oscillators 270 are arranged in a line substantially parallel to the leading edge of the wing.

Figure 5:
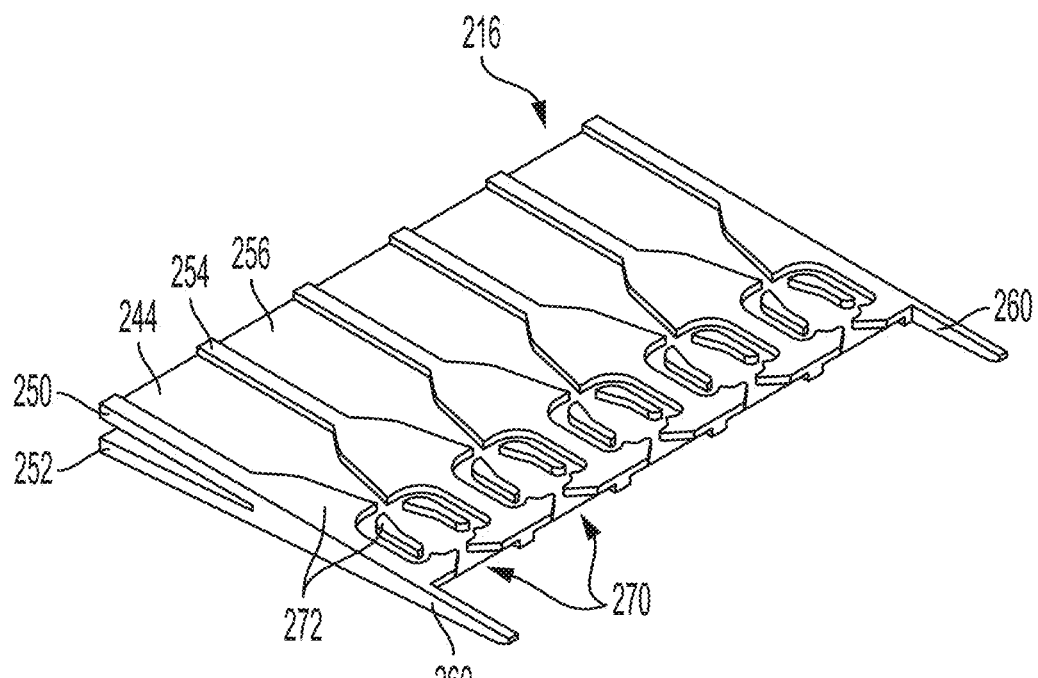
FIG. 5 is a cutaway isometric front view of the dispersal structure of FIG. 4, showing the fluidic oscillators of the second layer.
Figure 6:
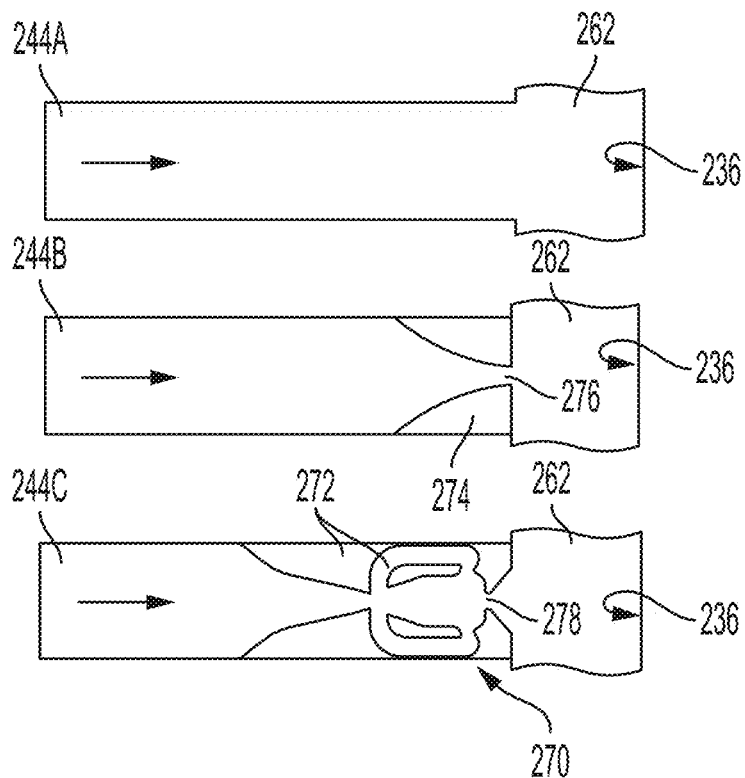
FIG. 6 is a schematic diagram of three illustrative delivery channels.
Figure 7:
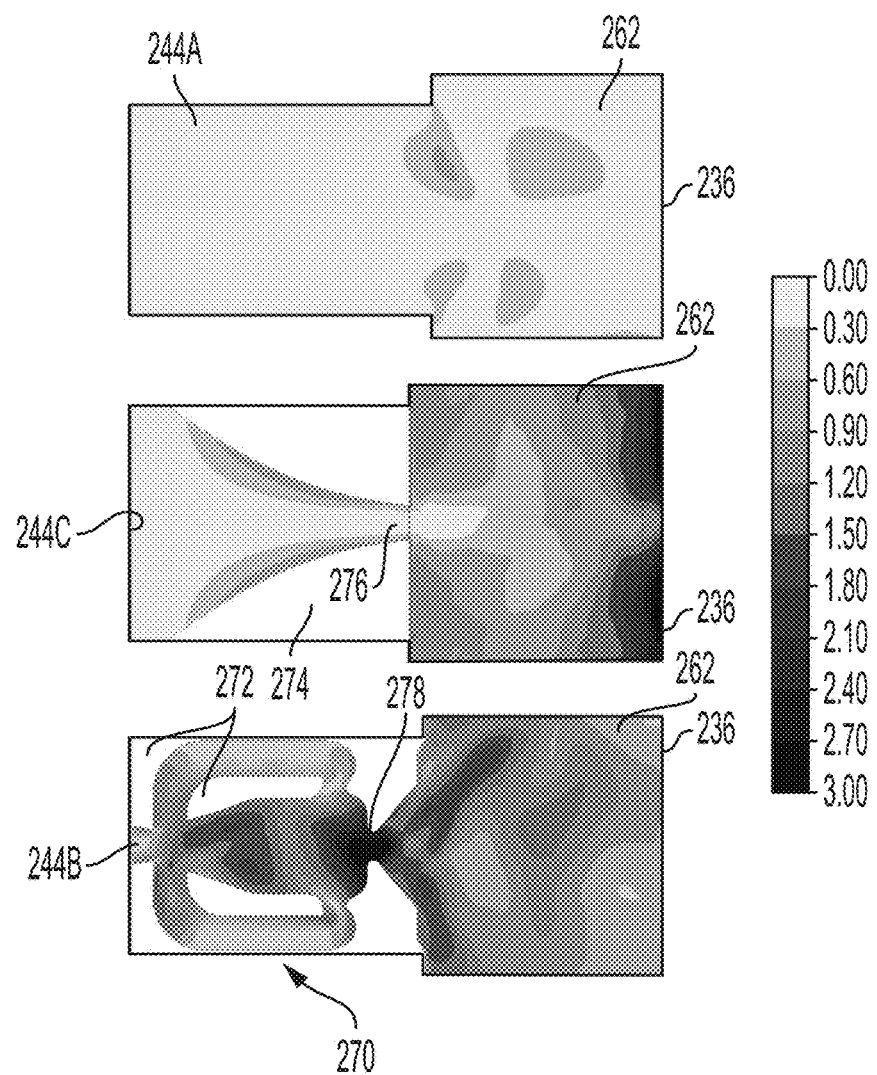
FIG. 7 is a diagram of flow velocities of coolant through the illustrative delivery channels of FIG. 6, according to a coolant flow simulation.

Each fluidic oscillator 270 is disposed at a distal end of a delivery channel 244. That is, each delivery channel 244 includes a fluidic oscillator 270 proximate outlet 267. An illustrative fluidic oscillator geometry is depicted in FIGS. 5-7, including symmetrical barrier walls 272, some of which are joined with vertical walls 254. Dispersal structure 216 may include any barrier walls 272 or other structures which convert a steady flow of coolant fluid along delivery channels 244 into self-excited periodic flow. That is, the dispersal structure may include any type, geometry, and/or frequency of fluidic oscillator. In the present example, each the fluidic oscillator 270 of each delivery channel 244 is the same. In some examples, the dispersal structure may include differing fluidic oscillators. For instance, a fluidic oscillator of a first frequency may be alternated with a fluidic oscillator of a second frequency.

Each fluidic oscillator 270 is configured to produce a spanwise sweeping jet, or a jet of coolant which sweeps spanwise relative to the wing. That is, to produce a jet which oscillates along a line parallel to the span of the wing. The produced jet impinges on internal surface 236 (See FIG. 2), and sweeps along the surface. The sweeping motion may prevent fixed stagnation points in the coolant and improve flow of heated and/or evaporated coolant away from the internal surface. Required heat transfer may be achieved with less mass flow of coolant, as compared to a system channeling fluid along internal surface 236, reducing overall weight of the cooling system.

Fluidic oscillators 270 may be tuned to achieve desired efficiency levels of the cooling system. For example, the range of the jet, the frequency, the angular extent of the sweep and the direction of the sweep may be selected according to testing and/or modeling of the wing under operational conditions. Fluidic oscillators 270 may be configured to produce sweep jets with any orientation, including chordwise, or oscillating along a line at an oblique angle relative to the span of the wing.

In the present example, fluidic oscillators 270 are used to create unsteady coolant flow. In general, a dispersal structure according to the present disclosure may include any structure and/or device configured to product one or more fluctuating jets. Fluctuating jets may be understood to include any unsteady fluid flow, such as sweeping jets, meandering jets, and pulse jets. Fluctuation of the jets may be transverse in a spanwise, chordwise, or other direction, may be longitudinal along a flow direction of the jet, and/or a combination thereof.

Fluidic oscillators may be particularly desirable as a means of generating a fluctuating jet. More specifically, fluidic oscillators may produce strong fluctuations with limited weight penalty, and without power requirements. Fluidic oscillators may be producible at the necessary scale for the leading edges of hypersonic aircraft or other sharp airfoils, for instance by additive manufacture. However, other structures having similar and/or other benefits may be used.

FIG. 6 is a schematic diagram of three illustrative delivery channels 244A, 244B, and 244C. FIG. 7 is a diagram of flow velocities in the three delivery channels, as determined by a coolant flow simulation. The diagram shows time averaged absolute spanwise flow velocities for each channel, with the indicated scale in meters per second.

Channel 244A is an unrestricted or straight slot channel, including no barriers or other structures configured to alter fluid flow. Unrestricted channel 244A may generate a steady jet of fluid into open region 262 and toward internal surface 236. As shown in FIG. 7, the unrestricted channel creates little to no spanwise velocity, which may lead to stagnation of the coolant fluid at internal surface 236 and associated cooling inefficiency, hot spots, and potentially damaging effects such as film boiling.

Channel 244B is a single restricted aperture channel, including two symmetrical arcuate barriers 274. The barriers converge to a single aperture 276, through which coolant fluid enters open region 262. Restricted channel 244B may generate a pulse jet of fluid toward internal surface 236. As shown in FIG. 7, the pulsation of the jet drastically improves spanwise movement of the coolant, particularly along internal surface 236. Such movement may clear out heated coolant, improving heat transfer rates and suppressing formation of vapor columns that lead to vapor lock along the surface (also known as the Critical Heat Flux or Leidenfrost point). Spanwise velocity is also greater in open region 262, which may increase coolant mixing and likewise improve heat transfer rates.

Channel 244C is a fluidic oscillator channel, including a fluidic oscillator 270 as described above, with symmetrical barrier walls 272. Barrier wall 272 also converge to a single aperture 278, through which coolant fluid enters open region 262. Fluidic oscillator 270 may generate a spanwise sweeping jet of fluid toward internal surface 236. Spanwise velocity in open region 262 is greatest proximate aperture 278, and more evenly spread through the open region compared to channel 244B.

A fluidic oscillator, a restricted aperture, or another structure may be selected according to a resulting flow pattern as illustrated in FIG. 7. Other properties of channels 244 such as a channel width may also be varied to achieve desired flow.

B. Illustrative Leading Edge Cooling System

Figure 8:
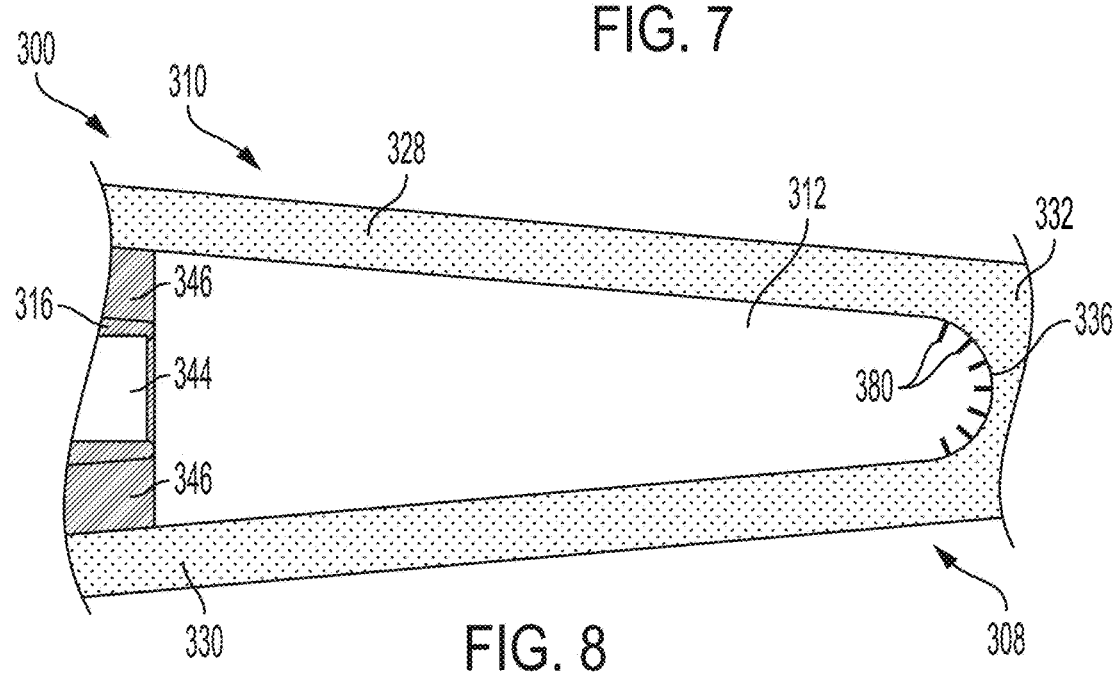
FIG. 8 is a chordwise cross-sectional view of a portion of another illustrative leading edge cooling system.
Figure 9:
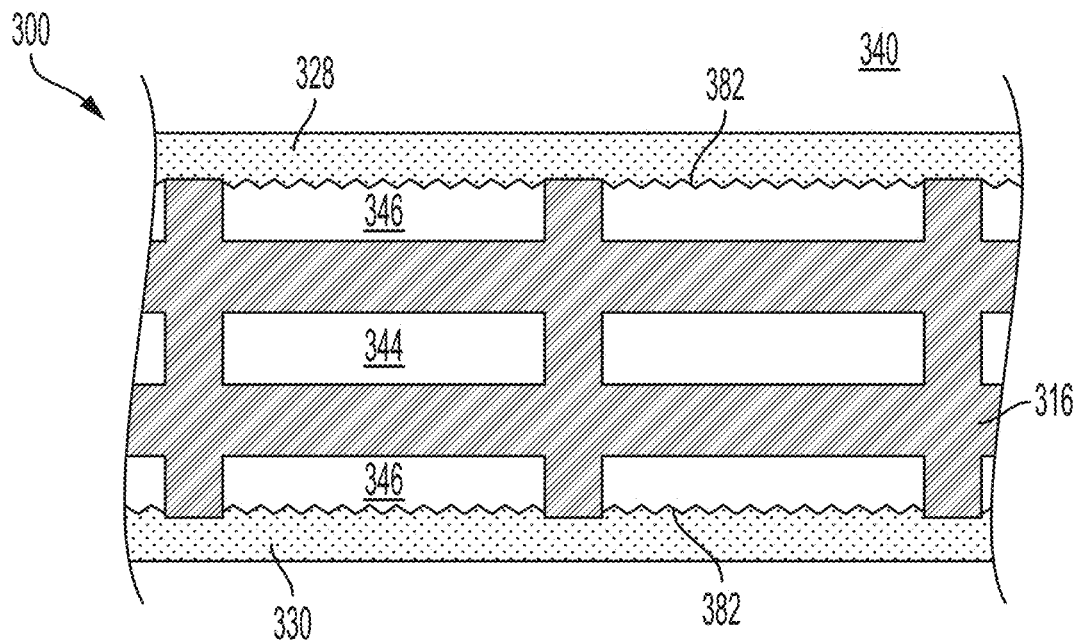
FIG. 9 is a spanwise cross-sectional view of a portion of the leading edge cooling system of FIG. 8.

As shown in FIGS. 8-9, this section describes an illustrative cooling system 300. Cooling system 300 is an example of a leading edge cooling system, as described above. Cooling system 300 may be substantially similar to cooling system 200, as described above. Accordingly, corresponding components have been assigned a corresponding reference number.

Cooling system 300 includes a leading edge 308 of a wing 310. The leading edge includes an upper skin 328 and a lower skin 330, which converge to a wingtip 332. A cavity 312, inside leading edge 308, is defined between a concave internal surface 336, an internal surface of upper skin 328 and an internal surface of lower skin 330. A fluid dispersal device, or dispersal structure 316 is disposed in and shaped to conform to internal cavity 312.

Cooling system 300 is configured to channel a flow of coolant to impinge on concave internal surface 336, to carry away heat from wingtip 332. Cooling system 300 may include any appropriate fluid coolant, including liquid, gas, and/or a combination thereof. The coolant is supplied from a coolant source, not shown, through a plurality of delivery channels 344. The delivery channels each generate a fluctuating jet of coolant, impinging on concave internal surface 336 to absorb heat. The heated coolant is then urged over and under the jet of coolant, along the internal surfaces of upper skin 328 and lower skin 330 into return channels 346. The return channels may return the coolant to the coolant source for subsequent reuse.

In the present example, leading edge 308 is configured to facilitate heat transfer to and from the coolant. As shown in FIG. 8, concave internal surface 336 includes a plurality of micro-fins 380. Each fin is elongate, extending spanwise along the concave internal surface and out approximately orthogonal to the concave internal surface.

Micro-fins 380 may have any appropriate spanwise extent. For example, the micro-fins may match a spanwise extent of dispersal structure 316. Micro-fins 380 may have a radial extent, away from concave internal surface 336, less than a radius of the concave internal surface. In the present example, the micro-fins each have a radial extent of approximately 0.25 millimeters. Micro-fins 380 are configured to increase a wetted surface area of concave internal surface 336 affected by impinging coolant flow from dispersal structure 316. The micro-fins may thereby increase a rate of heat transfer between the concave internal surface and the coolant.

In the present example, micro-fins 380 are monolithic with wing 310 and concave internal surface 336. Continuous material may provide a best heat transfer rate. However, micro-fins 380 may be comprised of any material, and joined to the concave internal surface in any effective manner. Micro-fins 380 may include any structure appropriate for increasing a surface area of concave internal surface 336 and/or improving heat transfer from the concave internal surface to the coolant. For example, micro-fins 380 may have a non-linear geometry, may be non-rectangular in cross-section, and/or may extend at an oblique angle from concave internal surface 336.

As shown in FIG. 9, the internal surface of each of upper skin 328 and lower skin 330 includes a micro-texture 382. The micro-texture includes a plurality of elongate structures, each extending chordwise along the internal surfaces. In the present example, each elongate structure of micro-texture 382 has a triangular cross-section and extends approximately 0.25 millimeters from the corresponding internal surface.

Micro-texture 382 is configured to increase a wetted surface area of internal surfaces of upper skin 328 and lower skin 330 affected by coolant flow along return channels 346. The micro-texture may thereby increase a rate of heat transfer from the coolant, through the upper and lower skins, to an external environment 340.

In the present example, micro-texture 382 is monolithic with upper skin 328 and lower skin 330. Continuous material may provide a best heat transfer rate. However, microtexture 382 may be comprised of any material, and joined to the upper and lower skins in any effective manner. Microtexture 382 may include any structure appropriate for increasing a surface area of the internal surfaces of the upper and lower skins and/or improving heat transfer from the coolant to external environment 340. For example, microfins 380 may have a non-linear geometry, may be recessed into the internal surface of the skins, and/or may include fins similar such as micro-fins 380.

C. Illustrative Method

Figure 10:
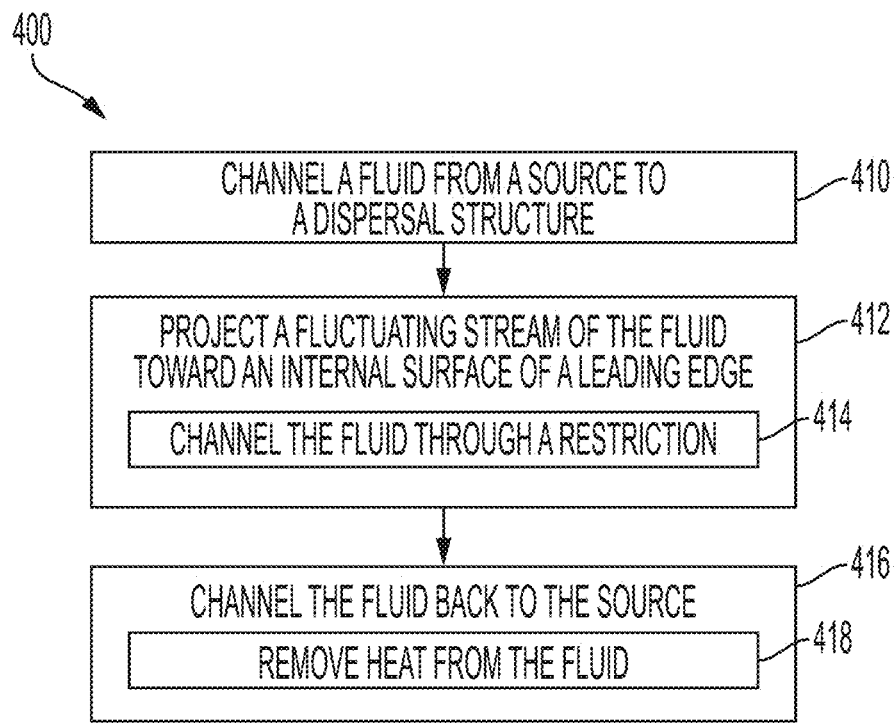
FIG. 10 is a flow chart depicting steps of an illustrative method for cooling the leading edge of a hypersonic aircraft wing, according to the present teachings.

This section describes steps of an illustrative method 400 for cooling the leading edge of a hypersonic aircraft wing; see FIG. 10. Aspects of cooling systems described above or below may be utilized in the method steps described below. Where appropriate, reference may be made to components and systems that may be used in carrying out each step. These references are for illustration, and are not intended to limit the possible ways of carrying out any particular step of the method.

FIG. 10 is a flowchart illustrating steps performed in an illustrative method, and may not recite the complete process or all steps of the method. Although various steps of method 400 are described below and depicted in FIG. 10, the steps need not necessarily all be performed, and in some cases may be performed simultaneously or in a different order than the order shown.

At step 410, the method includes channeling a fluid from a source to a dispersal structure. The fluid may be a coolant liquid, and may be channeled through tubing, channels, and/or any effective structure. The source may include a tank or reservoir of the fluid, as well as a compressor, pump, or other apparatus configured to pressurize the fluid. In some examples, the coolant source may be integrated into another cooling system, such as an aircraft engine cooling system.

The dispersal structure may include a plurality of channels, ducts, and/or conduits configured to channel the fluid. The plurality of channels may include at least a first subset of channels configured to direct the fluid in a first direction and a second subset of channels configured to direct the fluid in a second, opposing direction. The first and second subsets of channels may be vertically stacked.

The dispersal structure may be shaped to conform to an interior space of the leading edge of the hypersonic aircraft wing. For example, the dispersal structure may have a wedge shape. The dispersal structure may extend along a full span of the wing, and/or may be comprised of multiple modules which each have a limited spanwise extent. In some examples, the dispersal structure may be integrated with and/or perform structural function in the leading edge of the airfoil. The dispersal structure may also be described as a substructure, structural element, and/or centerbody.

Step 412 of the method includes projecting a fluctuating stream of the fluid toward an internal surface of the leading edge. A fluctuating stream may include any unsteady fluid flow, such as sweep jets, meandering jets, and/or pulse jets. Fluctuation of the stream may be transverse in a spanwise, chordwise, or other direction, may be longitudinal along a flow direction of the stream, and/or a combination thereof.

The dispersal structure may be configured to generate the fluctuating stream of fluid, and may be disposed such that the stream is projected toward the internal surface. That is, the dispersal structure may be disposed in an internal cavity of the leading edge, oriented toward the internal surface. Fluid channeled from the source in step 410 may be projected from the dispersal structure onto the internal surface.

Sub-step 414 of method 400 includes channeling the fluid through a restriction. The restriction may be formed in one of the first subset of channels of the dispersal structure. In some examples, each of the first subset of channels may include a restriction. For instance, each channel may include a fluidic oscillator and/or may include a narrowed aperture proximate a distal end of the channel.

At step 416, the method includes channeling the fluid back to the source. Once the fluid has absorbed heat from the internal surface, thereby cooling the internal surface, the pressure of incoming fluid may urge the fluid into the second subset of channels of the dispersal structure. The dispersal structure may channel the fluid back to the source.

Sub-step 418 of the method includes removing heat from the fluid. The heat absorbed from the internal surface may be removed from the fluid as the fluid is channeled back to the source, and/or before delivery back to the source. In examples where the fluid absorbs sufficient heat from the internal surface to partially or fully transition from a liquid phase to a gaseous phase, removal of heat from the fluid may allow the fluid to return to the liquid phase. The fluid may thereby be reused in repetition of steps 410-414 of the method, for continuous cooling of the leading edge of the hypersonic aircraft wing.

The fluid may be cooled by any effective method. For example, the dispersal device may be configured to channel the fluid along an internal surface of a skin of the wing. The wing skin may absorb heat from the fluid and transfer the heat to an exterior environment of the wing. In some examples, the wing skin may be configured to facilitate effective heat transfer from the fluid.

D. Illustrative Aircraft and Associated Method

Figure 11:
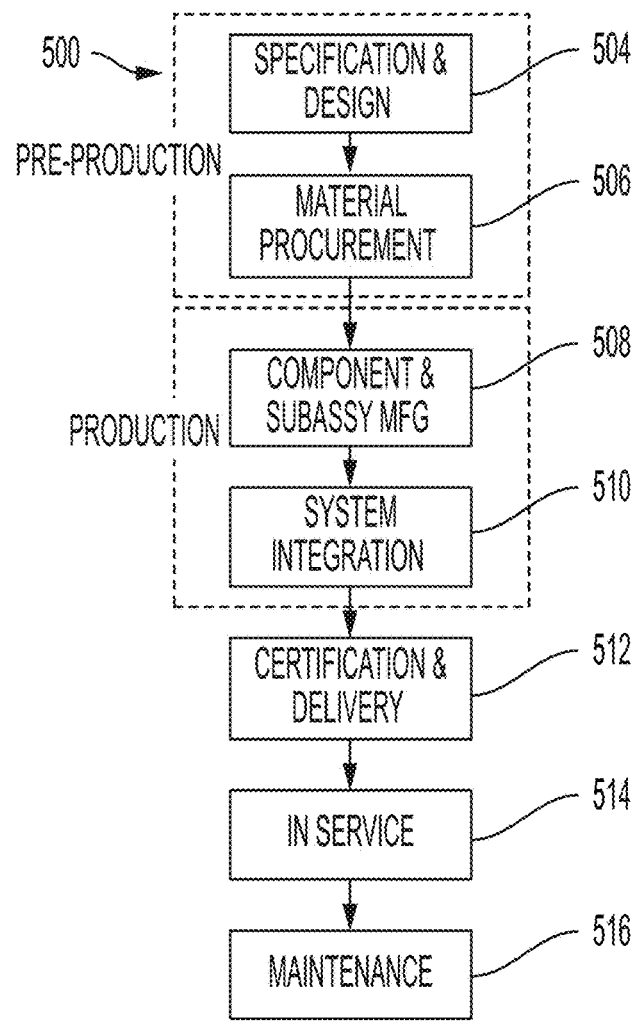
FIG. 11 is a flowchart depicting steps of an illustrative aircraft manufacturing and service method.
Figure 12:
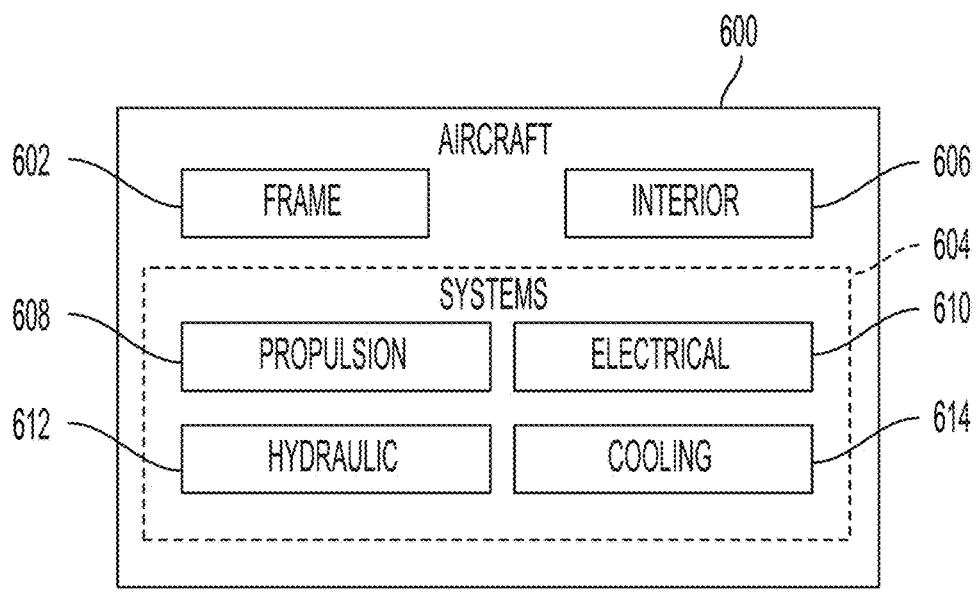
FIG. 12 is a schematic diagram of an illustrative aircraft.

Examples disclosed herein may be described in the context of an illustrative aircraft manufacturing and service method 500 (see FIG. 11) and an illustrative aircraft 600 (see FIG. 12). Method 500 includes a plurality of processes, stages, or phases. During pre-production, method 500 may include a specification and design phase 504 of aircraft 600 and a material procurement phase 506. During production, a component and subassembly manufacturing phase 508 and a system integration phase 510 of aircraft 600 may take place. Thereafter, aircraft 600 may go through a certification and delivery phase 512 to be placed into in-service phase 514. While in service (e.g., by an operator), aircraft 600 may be scheduled for routine maintenance and service 516 (which may also include modification, reconfiguration, refurbishment, and so on of one or more systems of aircraft 600). While the examples described herein relate generally to operational use during in-service phase 514 of aircraft 600, they may be practiced at other stages of method 500.

Each of the processes of method 500 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 12, aircraft 600 produced by illustrative method 500 may include a frame 602 with a plurality of systems 604 and an interior 606. Examples of plurality of systems 604 include one or more of a propulsion system 608, an electrical system 610, a hydraulic system 612, and a cooling system 614. Cooling system 614 may be an example of a leading edge cooling system as described above. Each system may comprise various subsystems, such as controllers, processors, actuators, effectors, motors, generators, etc., depending on the functionality involved. Any number of other systems may be included. Although an aerospace example is shown, the principles disclosed herein may be applied to other industries, such as the automotive industry, rail transport industry, and nautical engineering industry. Accordingly, in addition to aircraft 600, the principles disclosed herein may apply to other vehicles, e.g., land vehicles, marine vehicles, etc.

Apparatuses and methods shown or described herein may be employed during any one or more of the stages of the aircraft manufacturing and service method 500. For example, components or subassemblies corresponding to component and subassembly manufacturing phase 508 may be fabricated or manufactured in a manner similar to components or subassemblies produced while aircraft 600 is operating during in-service phase 514. Also, one or more examples of the apparatuses, methods, or combinations thereof may be utilized during manufacturing phase 508 and system integration phase 510, for example, by substantially expediting assembly of or reducing the cost of aircraft 600. Similarly, one or more examples of the apparatus or method realizations, or a combination thereof, may be utilized, for example and without limitation, while aircraft 600 is in in-service phase 514 and/or during maintenance and service phase 516.

Illustrative Combinations and Additional Examples

This section describes additional aspects and features of leading edge cooling systems and methods, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. An impingement cooling system, comprising:
an airfoil having a leading edge and a concave internal surface,
a fluid source, and
a fluid dispersal device connected to the fluid source, configured to project a fluctuating stream of fluid toward the concave internal surface.

A1. The impingement cooling system of A0, wherein the fluid dispersal device includes a fluidic oscillator.

A2. The impingement cooling system of A0 or A1, wherein the fluid dispersal device generates a sweeping jet.

A3. The impingement cooling system of any of A0-A2, wherein the fluid dispersal device generates a pulsed jet.

A4. The impingement cooling system of any of A0-A3, wherein the fluid dispersal device generates a meandering steady jet.

A5. The impingement cooling system of any of A0-A4, wherein the fluid dispersal device is configured to generate a fluid stream that oscillates in a spanwise direction across the concave internal surface of the leading edge.

A6. The impingement cooling system of any of A0-A5, wherein the fluid dispersal device is configured to generate a fluid stream that oscillates in a chordwise direction over the concave internal surface of the leading edge.

A7. The impingement cooling system of any of A0-A6, wherein the fluid dispersal device is configured to generate a fluid stream that oscillates over the concave internal surface of the leading edge at an oblique angle relative to a chord of the airfoil.

A8. The impingement cooling system of any of A0-A7, wherein the concave internal surface of the leading edge has one or more fin structures configured to increase surface area and heat exchange with the fluid.

A9. The impingement cooling system of any of A0-A8, further comprising:
a channel configured to return fluid downstream of the concave internal surface of the leading edge, to the fluid source.

A10. The impingement cooling system of A9, wherein the channel is substantially parallel to an outer mold line of the airfoil.

A11. The impingement cooling system of A9 or A10, wherein the channel has one or more fins for increasing surface area and heat exchange with the fluid.

A12. The impingement cooling system of any of A0-A11, wherein the system is a closed fluid system, and further comprising:
a pressure management apparatus connected to the fluid source and configured to maintain a constant total pressure in the system.

A13. The impingement cooling system of A12, wherein the pressure management apparatus is a compressor or a pump.

A14. The impingement cooling system of any of A0-A13, wherein the leading edge has a wedge shape with a wedge angle of less than 15 degrees.

A15. The impingement cooling system of any of A0-A14, wherein the concave internal surface of the leading edge has a radius of less than 25 millimeters.

A16. The impingement cooling system of A15, wherein the concave internal surface of the leading edge has a radius of less than 10 millimeters.

A17. The impingement cooling system of A16, wherein the concave internal surface of the leading edge has a radius of less than 5 millimeters.

A18. The impingement cooling system of any of A0-A17, wherein the fluid dispersal device conforms to a wedge shaped internal cavity of the leading edge.

A19. The impingement cooling system of any of A0-A18, wherein the leading edge is aerodynamically sharp.

A20. The impingement cooling system of A19, wherein the leading edge is defined at least in part by a power law shape according to the equation $y=ax^n$ where n is less than one half, and a is a positive constant.

A21. The impingement cooling system of any of A0-A20, wherein the airfoil is the wing of a hypersonic aircraft.

B0. A method of cooling a leading edge of a wing of a hypersonic aircraft, comprising:
channeling fluid from a fluid source to a fluid dispersal device inside the wing, and
projecting a fluctuating stream of fluid from the fluid dispersal device toward an internal surface of the leading edge of the wing.

B1. The method of B0, wherein the projecting step includes channeling the fluid through an array of fluidic oscillators.

B2. The method of B0 or B1, wherein the projecting step includes channeling the fluid through a restricted aperture.

B3. The method of any of B0-B2, wherein the fluid oscillates across the internal surface in a spanwise direction.

B4. The method of any of B0-B3, wherein the fluid oscillates across the internal surface in a chordwise direction.

B5. The method of any of B0-B4, wherein the fluid oscillates across the internal surface at an oblique angle.

B6. The method of any of B0-B5, further comprising:
channeling the fluid back to the fluid source after the projecting step.

B7. The method of B6, wherein channeling the fluid back to the fluid source includes channeling the fluid along an upper skin and along a lower skin of the leading edge of the wing.

B8. The method of B6 or B7, wherein channeling the fluid back to the fluid source includes channeling at least a portion of the fluid in a liquid phase and at least a portion of the fluid in a gaseous phase.

B9. The method of any of B6-B8, further comprising:
removing heat from the fluid as it flows back to the fluid source.

B10. The method of B9, wherein removing heat from the fluid includes transitioning at least a portion of the fluid from a gaseous phase to a liquid phase.

B11. The method of any of B0-B10, wherein the projecting step includes:
directing fluid toward one or more fin structures on the internal surface.

B12. The method of any of B0-B11, wherein at least a portion of the fluid undergoes a phase change between a liquid phase and a gaseous phase.

C0. A cooling system for a leading edge of an airfoil, comprising:
a coolant source, and
a fluid dispersal device, including:
an array of delivery channels, each channel configured to project a fluctuating stream of coolant from the coolant source onto an internal surface of the leading edge of the airfoil, and
a first return channel configured to return coolant from the leading edge to the coolant source.

C1. The cooling system of C0, the fluid dispersal device further comprising:
a second return channel configured to return coolant from the leading edge to the coolant source,
wherein the first return channel is proximate an upper surface of the airfoil and the second return channel is proximate a lower surface of the airfoil.

C2. The cooling system of C0 or C1, further comprising:
a compressor configured to maintain a constant pressure inside the system.

C3. The cooling system of any of C0-C2, wherein the first return channel has one or more protrusions configured to increase surface area and heat exchange from the coolant.

C4. The cooling system of any of C0-C3, wherein each delivery channel includes a fluidic oscillator at a distal end.

C5. The cooling system of C4, wherein the fluidic oscillators are arranged in a line substantially parallel to the leading edge of the airfoil.

C6. The cooling system of C4 or C5, wherein the coolant source includes a liquid coolant, and the first return channel is configured to return the coolant in a liquid phase, a gaseous phase, or a combination thereof.

Advantages, Features, and Benefits

The different examples of the leading edge cooling systems and methods described herein provide several advantages over known solutions for thermal management of leading edges. For example, illustrative examples described herein allow safe and effective impingement cooling of sharp, thin airfoils having a small leading edge radius.

Additionally, and among other benefits, illustrative examples described herein allow safe and effective impingement cooling by avoiding fluid stagnation, vapor lock, and film boiling.

Additionally, and among other benefits, illustrative examples described herein alleviate thermal constraints on leading edge design, and allow use of less expensive materials.

Additionally, and among other benefits, illustrative examples described herein facilitate improved aerodynamic performance, by allowing reduction in leading edge radius.

Additionally, and among other benefits, illustrative examples described herein improve heat transfer over solid conduction and surface convection or radiative cooling.

Additionally, and among other benefits, illustrative examples described herein effectively remove heat with a minimal amount of coolant.

Additionally, and among other benefits, illustrative examples described herein operate as a closed system, and therefore do not require an extensive reservoir of coolant.

Additionally, and among other benefits, illustrative examples described herein allow cooling without ablation, preserving geometry and material of the leading edge and drastically reduce frequency of replacement.

No known system or device can perform these functions, particularly in aerodynamically sharp airfoils. Thus, the illustrative examples described herein are particularly useful for hypersonic aircraft. However, not all examples described herein provide the same advantages or the same degree of advantage.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. An impingement cooling system, comprising:
   an airfoil having a leading edge and a concave internal surface,
   a fluid source, and
   a fluid dispersal device connected to the fluid source, configured to project a fluctuating stream of fluid toward the concave internal surface.

2. The impingement cooling system of claim 1, wherein the concave internal surface of the leading edge has a radius of less than 10 millimeters.

3. The impingement cooling system of claim 1, wherein the fluid dispersal device conforms to a wedge-shaped internal cavity of the leading edge.

4. The impingement cooling system of claim 1, wherein the fluid dispersal device includes a fluidic oscillator.

5. The impingement cooling system of claim 1, wherein the fluid dispersal device is configured to generate a fluid stream that oscillates in a spanwise direction across the concave internal surface of the leading edge.

6. The impingement cooling system of claim 1, wherein the concave internal surface of the leading edge has one or more fin structures configured to increase surface area and heat exchange with the fluid.

7. The impingement cooling system of claim 1, further comprising:
   a channel configured to return fluid downstream of the concave internal surface of the leading edge to the fluid source.

8. The impingement cooling system of claim 7, wherein the channel is substantially parallel to an outer mold line of the airfoil.

9. The impingement cooling system of claim 1, wherein the system is a closed fluid system, and further comprising:
   a pressure management apparatus connected to the fluid source and configured to maintain a constant total pressure in the system.

10. A method of cooling a leading edge of a wing of a hypersonic aircraft, comprising:
    channeling fluid from a fluid source to a fluidic oscillator inside the wing, and
    projecting a fluctuating stream of fluid from the fluidic oscillator toward an internal surface of the leading edge of the wing.

11. The method of claim 10, wherein the projecting step includes channeling the fluid through an array of fluidic oscillators.

12. The method of claim 10, wherein the projecting step includes channeling the fluid through a restricted aperture.

13. The method of claim 10, further comprising:
    channeling the fluid back to the fluid source after the projecting step.

14. The method of claim 13, further comprising:
    removing heat from the fluid as it flows back to the fluid source.

15. The method of claim 10, wherein at least a portion of the fluid undergoes a phase change between a liquid phase and a gaseous phase.

16. A cooling system for a leading edge of an airfoil, comprising:
    a coolant source, and
    a fluid dispersal device, including:
        an array of delivery channels, each channel configured to project a fluctuating stream of coolant from the coolant source onto an internal surface of the leading edge of the airfoil, and
        a first return channel configured to return coolant from the leading edge to the coolant source,
    wherein the cooling system is a closed fluid system.

17. The cooling system of claim 16, the fluid dispersal device further comprising:
    a second return channel configured to return coolant from the leading edge to the coolant source,
    wherein the first return channel is proximate an upper surface of the airfoil and the second return channel is proximate a lower surface of the airfoil.

18. The cooling system of claim 16, further comprising:
    a compressor configured to maintain a constant pressure inside the system.

19. The cooling system of claim 16, wherein each delivery channel includes a fluidic oscillator at a distal end.

20. The cooling system of claim 19, wherein the fluidic oscillators are arranged in a line substantially parallel to the leading edge of the airfoil.

* * * * *